March 10, 1942. W. J. PODBIELNIAK 2,275,648
DISTILLATION CONTROL APPARATUS
Filed Aug. 21, 1940 5 Sheets-Sheet 1
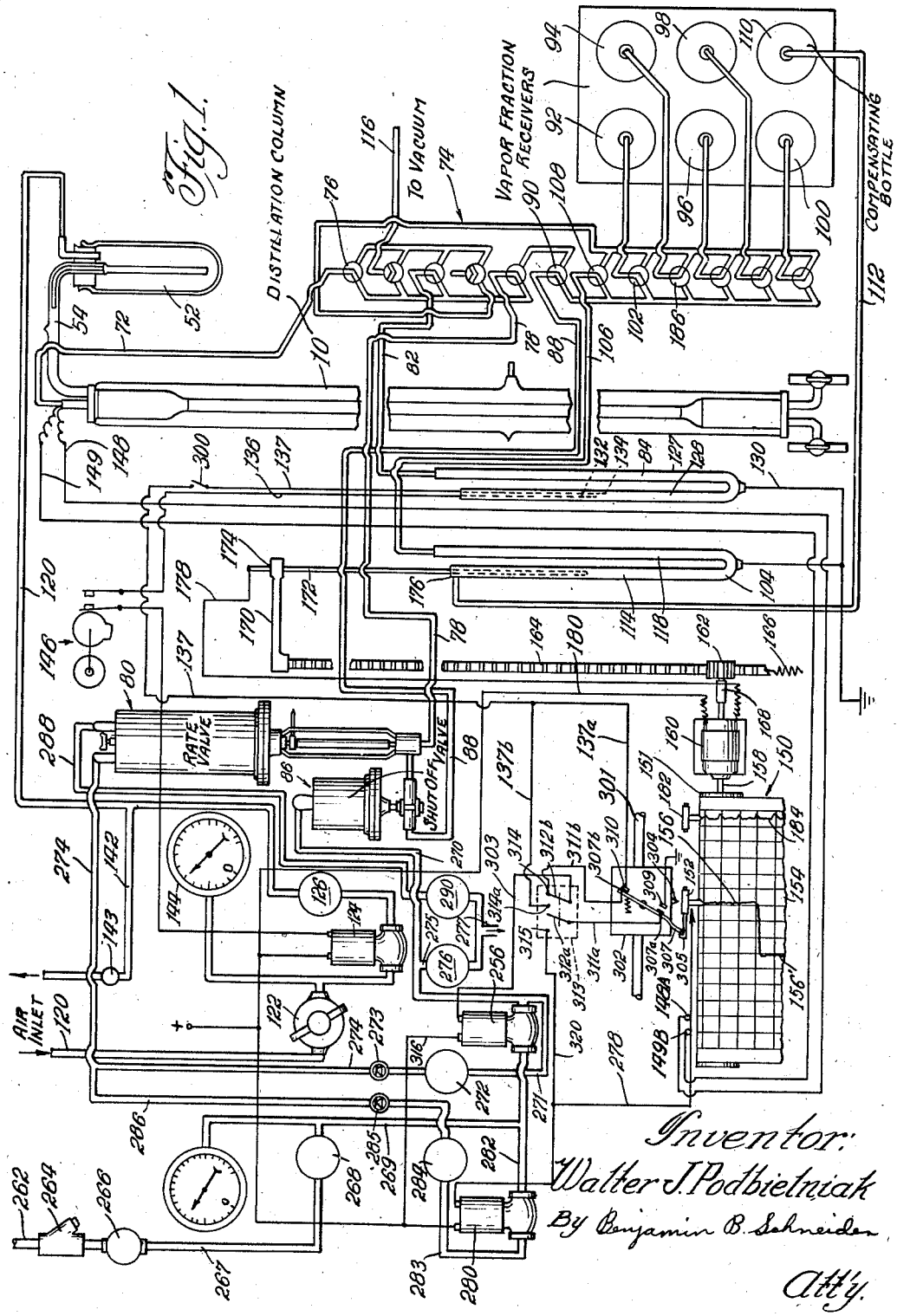
Inventor:
Walter J. Podbielniak
By Benjamin B. Schneider
Atty.

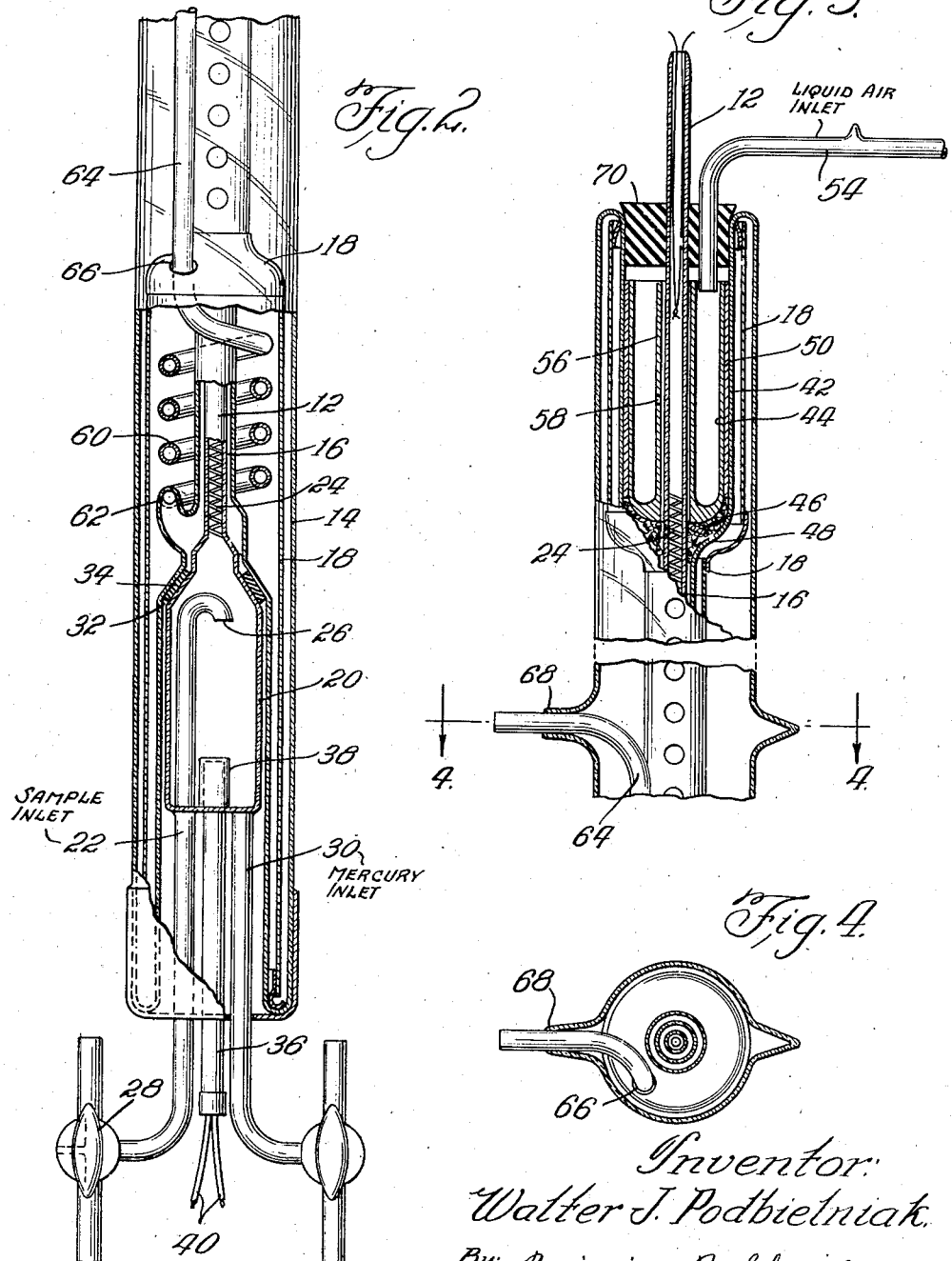

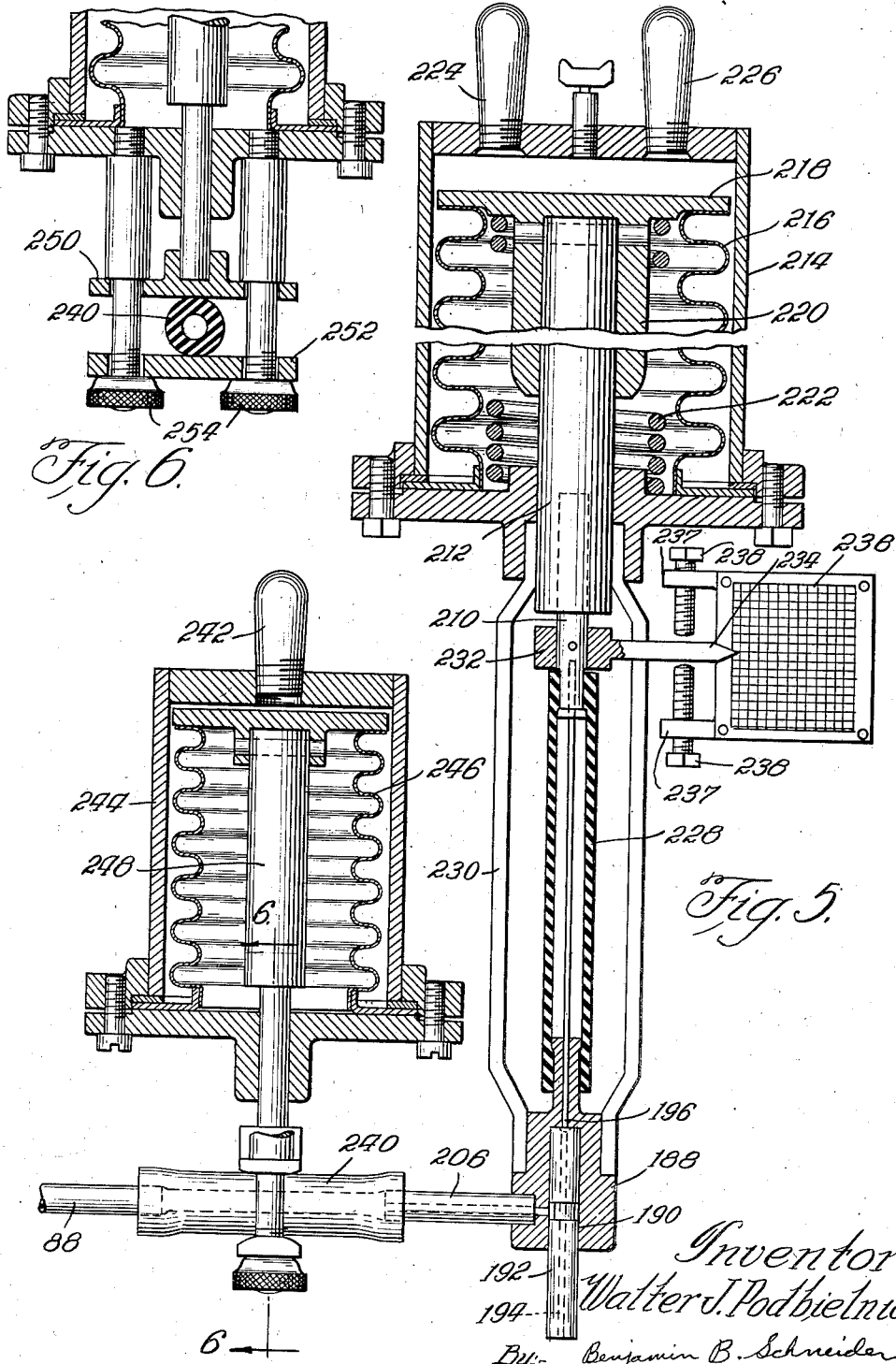

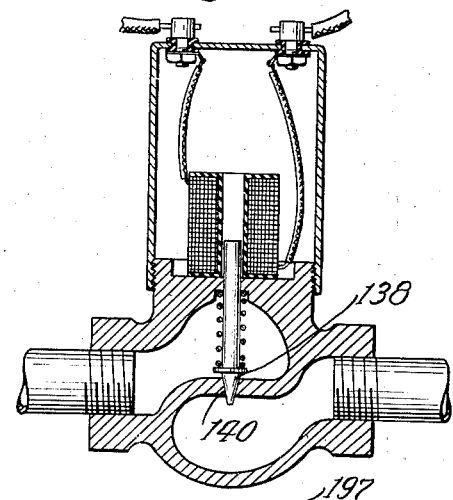
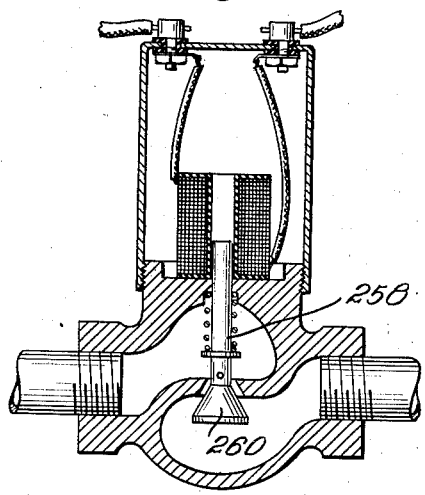
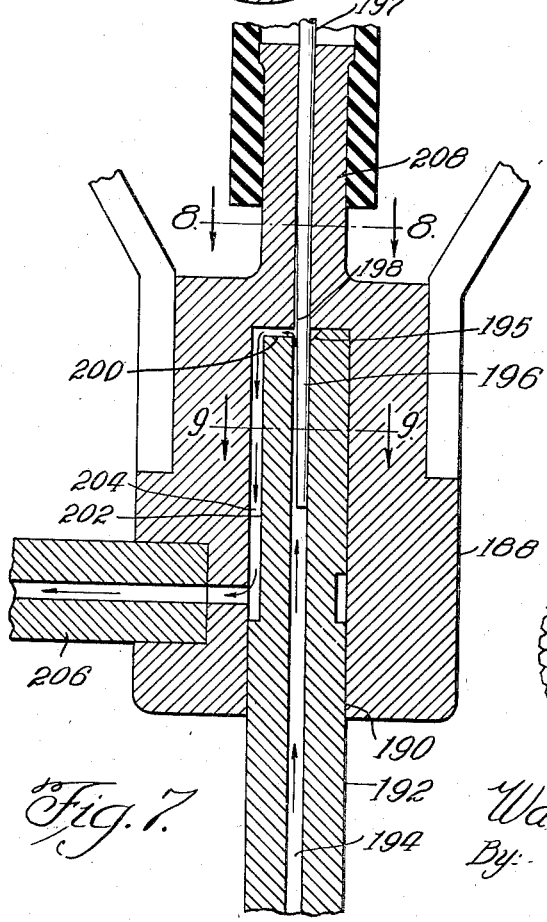
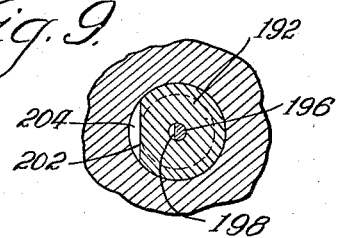
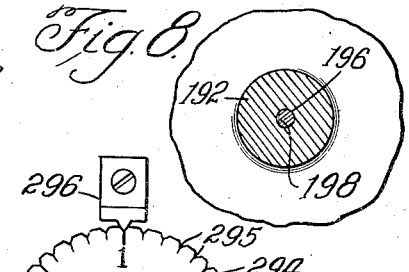

March 10, 1942.  W. J. PODBIELNIAK  2,275,648
DISTILLATION CONTROL APPARATUS
Filed Aug. 21, 1940  5 Sheets-Sheet 5

Inventor:
Walter J. Podbielniak
By: Benjamin B. Schneider
Atty

Patented Mar. 10, 1942

2,275,648

UNITED STATES PATENT OFFICE 2,275,648

DISTILLATION CONTROL APPARATUS

Walter J. Podbielniak, Chicago, Ill., assignor to Benjamin B. Schneider

Application August 21, 1940, Serial No. 353,462

33 Claims. (Cl. 202—160)

The present invention relates to improvements in fractional distillation, and more particularly to the control of the operating conditions, especially of reflux ratios, rates of distillation, and the like, in precise fractional distillation. It is an improvement over the invention described in my prior Patent No. 1,967,258, granted July 24, 1934. The apparatus in accordance with the present invention lends itself particularly for use for analytical purposes, as in the analysis of constituents of natural gas, natural gasoline, cracked gasoline and other petroleum distillates and of mixtures of other volatile materials such as chlorinated hydrocarbons, alcohols, ethers, aromatic hydrocarbons, manufactured gas, coal gas and the like.

In my prior Patents Nos. 1,917,272, granted July 11, 1933, and 2,009,814, granted July 30, 1935, and in my prior application Serial No. 303,434, filed November 8, 1939, I have described precision fractionating columns, particularly intended for analytical purposes and methods of distillation in connection with the operation thereof, whereby the precise analytical distillation of mixed liquids or liquefiable gases may be effected conveniently and rapidly, and an accurate determination of the individual constituents of said mixtures made. In accordance with the present invention, in the operation of such precision distillation columns, I secure an automatic control of the distillation operation as a whole, as well as a perfect and automatic control of the conditions within the columns themselves. I am also enabled to secure directly and automatically a complete record of the distillation corresponding to the usual fractional distillation curve and giving directly the relationship between temperature and quantity of material distilled, in contradistinction to the usual temperature-time curves ordinarily secured in such operations. By the apparatus in accordance with the present invention, I am able to maintain the progress of the distillation, after it has been started, substantially automatic.

The invention and the advantages thereof will be fully understood from the following description of the hydraulic distillation control apparatus in accordance with the present invention, illustrated by the accompanying drawings, in which:

Figure 1 is a general view, partly in elevation and largely diagrammatic, of a layout of apparatus suitable for carrying the invention into effect;

Figs. 2 and 3 are enlarged, detail, longitudinal sectional views through the lower distillation and upper reflux portions, respectively, of the fractionating column, with parts in elevation and broken away;

Fig. 4 is a transverse sectional view taken substantially along the line 4—4 of Fig. 3;

Fig. 5 is an enlarged, detail longitudinal sectional view through the hydraulic, distillation rate control and shut-off mechanisms of the apparatus, with parts in elevation and broken away;

Fig. 6 is an enlarged fragmentary, longitudinal sectional view through the shut-off mechanism taken substantially along the line 6—6 of Fig. 5;

Fig. 7 is an enlarged, detail, longitudinal sectional view of the distillation rate control valve showing the means for varying the rate of distillation;

Figure 15:
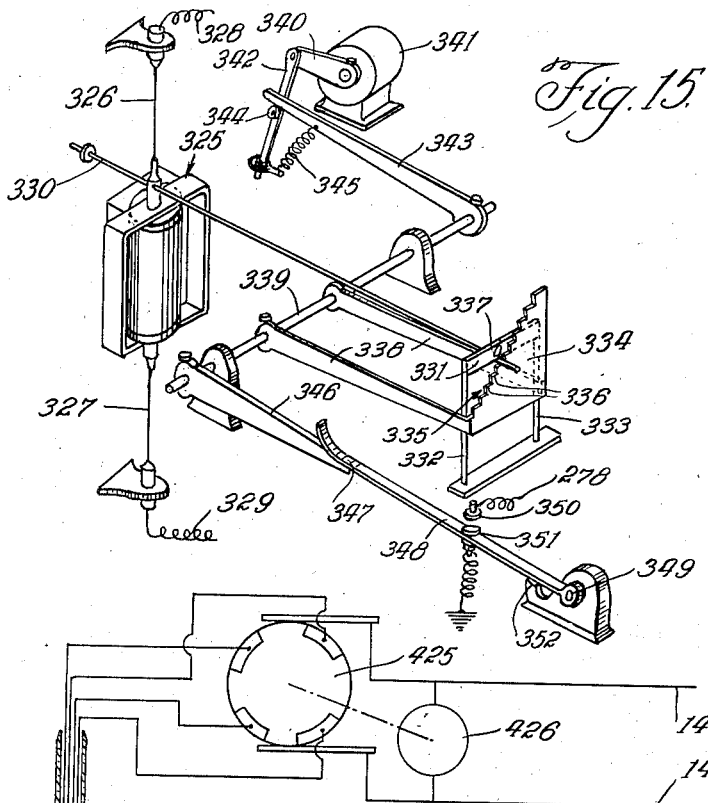
Figure 13:
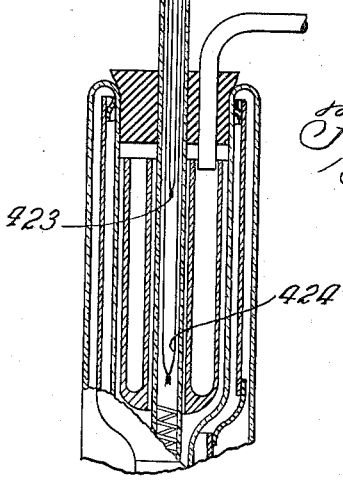
Figure 14:
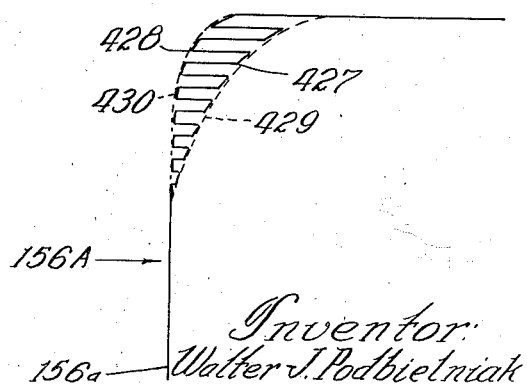

Figs. 8 and 9 are horizontal transverse sectional views thereof taken substantially along the lines 8—8 and 9—9, respectively, of Fig. 7;

Fig. 10 is a sectional, detail view of a solenoid-operated valve for the control of the water line to the distillation rate control portion of the apparatus;

Fig. 11 is a sectional, detail view through a solenoid-operated valve for the control of the supply of cooling medium to the fractionating column;

Fig. 12 is an elevation of a graduated valve wheel which is provided on the stems of the manually operated valves of the apparatus in accordance with the present invention;

Fig. 13 is an enlarged fragmentary diagrammatic view of a modified fractionating column and control mechanism in accordance with my invention;

Fig. 14 is a representation of a partial distillation curve produced by the apparatus in accordance with my invention utilizing the modified fractionating column and control mechanism of Fig. 13; and Fig. 15 is a perspective view, largely diagrammatic, of a temperature responsive control mechanism in accordance with my invention.

Referring more particularly to the drawings, the numeral 10 indicates, generally, a fractional distillation column which is substantially similar to the column described in my prior application Serial No. 303,434 above referred to. While I prefer to carry out the distillations in this type of column, it is, of course, to be understood that the columns of my prior patents above referred to, as well as other columns, may be used in lieu thereof.

This column structure (Figs. 2 to 4), as illustrated, is provided internally with an elongated distillation column or tube 12 surrounded by an evacuated jacket member 14, slightly spaced from the tube, as shown at 16, substantially throughout the length of the tube. Both distilling tube 12 and jacket 14 may be suitably formed of a low expansion, heat-resistant glass, such as that commercially known as "Pyrex," or of quartz or other suitable material. Spaced between the walls of the jacket member and mounted on wire supports having a low thermal conduction is a reflector member 18 which extends substantially throughout the length of the jacket as shown in the drawings and as more fully described in my prior application above referred to.

The distillation tube 12 may have any suitable dimensions, for example, one to six feet in length and, preferably, an internal diameter of from about 2.5 to about 3.5 mm. and up to about 5 mm. except for the lower enlarged extremity 20 which constitutes the distilling bulb into which the sample to be distilled is introduced through an inlet tube 22. Within the limits of internal diameter of the distilling tube as set forth above, capillary action is most effective in bringing about an extended and intimate contact of the vapor and reflux liquid without flooding or priming of the tube. Larger tubes may be employed, if desired. Tube 12 may be provided with a packing 24, suitably in the form of a coil or coils of small wires, or of a closely spaced wire structure, for the purpose of aiding in bringing about the more extended and intimate surface contact of the downwardly flowing reflux liquid with the vapors rising from the distilling bulb 20.

Sample inlet 22 is in the form of a glass tube which extends through the base of the distilling bulb and is sealed in place therein. The discharge end 26 thereof is well above the liquid level of the sample introduced into the bulb for distillation and is so arranged that liquid condensate formed in tube 12 and collecting in bulb 20 cannot back up into the entering tube and ultimately freeze and crack the stop-cock which controls the flow of samples from the sample containers.

A second glass tube 30 is sealed into the bottom of bulb 20 and serves to establish communication between the bulb and a mercury bottle (not shown) or between the bulb and a graduated receiver, (not shown) for the purposes fully described in my prior application above referred to.

The space between the upper portion of distilling bulb 20 and the inner wall 32 of jacket 18 is substantially plugged with a gasket 34 which closes the bottom of passageway 16.

Heat may be supplied to the sample in the distilling bulb 20, for example, by the metal-clad, cartridge-type, electric resistance heater 36 which extends into an "off-centered" glass heater well 38 formed in the bottom of the bulb. The current supply wires 40 of the heating element lead to a conventional rheostat (not shown) which may be controlled to regulate accurately the heat input to the liquid portion of the sample in the bulb in order to effect a desired rate of vaporization. Obviously, any other suitable heating means may be employed for this purpose.

At the upper end of the column, the evacuated jacket 18 is enlarged, as at 42, to provide a space between the inner wall of the jacket and the distilling tube 12 for a metal reflux chamber or vessel 44 into which liquid air is introduced for cooling the distilling tube to condense vapors therein and provide reflux. Vessel 44 may be, suitably, in the form of a double-walled, annular container which may, if desired, be filled with suitable packing and provided with chambers and baffle plates (not shown) for the purpose of controlling and distributing the flow of liquid air vapors rising therein. Also, if desired, there may be placed in the vessel a suitable material having a high specific heat, for example, glass beads, as described in my prior Patent No. 1,917,272. Vessel 44 is supported in the reflux portion of the column, as by the glass wool insulating material 46 which is packed around the distilling tube and rests on a shoulder 48 formed in the inner wall 32 of the evacuated jacket. The vessel is additionally supported by insulation material 50, suitably asbestos, which is positioned between the periphery of the outer wall of the vessel and the inner wall of the evacuated jacket.

Vapors rising in the distilling tube from the boiling liquid in the distilling bulb 20 are cooled and condensed to provide reflux, as by the medium of vaporized and/or unvaporized liquid air supplied to passageway 16. The liquid air is supplied from a thermos bottle 52 containing liquid air which communicates with vessel 44 through a vacuum-jacketed, silvered tube 54. The liquid air introduced into the vessel becomes vaporized and the vaporized liquid air flows out of the top of the vessel and down through the space between the inner wall 56 of the vessel and tube 12, through packing 46 and into passageway 16. If desired, the inner wall 56 of the vessel may be perforated, as at 58 to provide openings through which unvaporized liquid air may spill over into passageway 16 to provide additional cooling means for the distilling tube for purposes of producing reflux and for condensing vapors in the lower portion of the tube as fully described in my prior application above referred to. The vaporized and, if desired, unvaporized liquid air, flow down through passageway 16 to the gasket 34 and the vapors discharge to the atmosphere through a moderately flexible, spiral glass coil 60 which is joined to the inner wall of the evacuated jacket, as at 62. Coil 60 has an upwardly extending conduit 64 which passes through an opening in reflector 18, as at 66, and passes out of the column through an opening in the outer wall of the evacuated jacket as at 68.

The top of the distilling column is closed by a seal or plug 70 through which the upper extremity of distilling tube 12 and one extremity of evacuated tube 54 extend.

Fractionated vapors passing out of the distilling tube flow through a vapor outlet line 72 which communicates with a selective manifold arrangement, referred to generally by the numeral 74, which, through the medium of three-way, 120° stop-cocks 76, for example, may distribute the vapors as desired throughout the apparatus as hereinafter described and as is fully apparent from the drawings. In practice, the vapors passing through the vapor outlet line 72 enter the selective manifold arrangement and are directed to the vapor line 78 which communicates with the bottom of the distillation rate control mechanism, referred to generally by the numeral 80, which will be fully described hereinafter. The manifold also serves to establish communication between the vapor outlet line 72 and vapor line 82 leading to manometer 84 which indicates and controls the pressure conditions prevailing in the column. The vapors passing through the bottom or valve portion of the distillation rate control mechanism 80 are in turn conducted through the automatic shut-off valve, designated generally by the numeral 86, and then through the return line 88 leading to the selective manifold 74. Line 88 communicates with the vapor receiving section of the manifold through stock-cock 90 and the vapors flowing therethrough may be directed, as desired, to one of the vapor receivers 92, 94, 96, 98 and 100 by manipulation of the stop-cocks. Connected as shown, vapor in line 88 will flow into receiver 92 through stop-cocks 90 and 102.

Each of the receivers for the vapor is maintained under a reduced pressure and at a temperature such that the contents thereof are kept in vapor form as fully described in my prior patents hereinbefore referred to. Each receiver is of fixed volume and the increase of pressure therein resulting from the inflow of vapors evolved from the distillation column is indicated by a manometer 104. Thus, as shown, receiver 92 is in communication with line 106 through stock-cock 108, and line 106, in turn, with manometer 104. It is apparent from the drawings that by a suitable manipulation of the stopcocks communication can be established between any of the receivers and manometer 104 to determine the pressure of the vapors within the receivers at any time. Manometer 104 functions additionally in controlling the operation of the distillation as hereinafter more fully set forth.

At the beginning of distillation of a sample to be subjected to analysis, for example, natural gasoline, a compensating bottle 110, conveniently housed in the same water bath as the vapor receiver bottles, is equalized to atmospheric conditions through a vent and a stop-cock (not shown). Compensating bottle 110 is in communication with the closed end of the left hand arm 114 of the manometer 104 through the line 112 and, in consequence, the conditions in the space above the mercury in the left hand arm 114 are equalized with those in the compensating bottle 110. The compensating bottle is now closed to the air and the system is thus made independent of changes in barometric pressure. By virtue of this precaution, the effect of changes in barometric pressure, which would normally effect the mercury level in the manometer and thereby cause error, is avoided.

The entire system is now evacuated to as low a pressure as desired through line 116 which communicates with the selective manifold arrangement. One of the vapor receiving bottles, for example, bottle 92, is placed in communication with the right hand arm 118 of manometer 104 and with line 88, as shown in the drawings.

After the system is evacuated, distilling column 10 is isolated by turning stop-cock 76 and the column is cooled by supplying a cooling medium such as liquid air to cooling vessel 44 and passageway 16. The supply of liquid air to passageway 16 is controlled by a compressed air supply line 120 in which are a pressure regulator 122, a control valve 124 and a regulating throttle valve 126. The operation and construction of control valve 124 will be described hereinafter. When the desired cooling has been effected, the sample to be subjected to distillation is introduced into distilling bulb 20 and the stop-cocks at the bottom of column 10 are closed, as fully described in my prior application. At this time the pressure in the column is usually still somewhat below atmospheric, and heat is supplied through the heating element 36 to effect vaporization of the sample and to build up pressure within the column to approximately atmospheric or otherwise, as found desirable for the particular material under treatment. Distillation is now allowed to proceed by turning stock-cock 76 to the position shown in the drawings so that the vapors are brought into communication with the rate valve 80 as hereinbefore described. The vapors then flow to the desired receiving bottle, which is under a lower pressure than that prevailing in the column. The operations of initiating distillation are fully set forth in my prior application and prior Patents Nos. 1,917,272 and 2,009,814 above referred to.

The distillation having been initiated, its progress is automatically controlled in accordance with the present invention as fully set forth hereinafter.

Manometer 84 is sensitive to pressure conditions in the column, through line 72, the selective manifold and line 82, as hereinbefore set forth. As is apparent from the drawings, manometer 84 is suitably of the U-tube type with a closed leg 127, with which line 82 communicates, and an open leg 128. Within the manometer is a suitable liquid, for example, mercury, which is connected by a suitable conductor wire 130, passing through the glass of the tube, with one pole of a suitable source of electricity. As is apparent, an increase of pressure in the column forces the mercury in the manometer upwardly in the open leg 128.

Extending into the open leg 128 of the manometer are a pair of contact rods 132 and 134. The lower extremities of the contact rods are set approximately 2 to 5 mm. apart, the extremity of rod 132 being higher than the corresponding extremity of rod 134. These wires or rods are set in the open arm of the manometer so that their lower extremities straddle the operating level of the mercury. Contact rod 132 is provided with an electrical connection 136 leading to the valve 124 in the compressed air supply line 120, and contact rod 134 is provided with an electrical connection 137 leading to a valve 256, through either line 137—a or line 137—b, a switch block 313 and a line 303.

Valve 124 is of the conventional electromagnetic solenoid operated, normally closed type and opens to permit the flow of compressed air through line 120 when the rising level of the mercury in the open leg 128 of the manometer contacts rod 132 and closes the circuit. Although in practice it is preferred to operate this and other control circuits described herein through relay circuits, for simplicity in illustration, direct control circuits are shown herein.

Valve 124 is shown in section on an enlarged scale in Fig. 10. The solenoid operates the conical valve member or plug 138, which is normally held against its valve seat 140 by spring pressure. On operation of the solenoid the valve opens and permits a flow of compressed air through line 120 and into bottle 52 to force liquid air into passageway 16 to cool and restore the pressure within the column to normal. The column of mercury in arm 128 lowers in response to this decrease of pressure in the column until contact with rod 132 is broken. The valve controlling the supply of compressed air to bottle 52 then returns to its normal closed position.

The operation of the valve member 138 in the manner hereinbefore described causes the supply of a substantial additional quantity of compressed air to bottle 52 and of a corresponding additional supply of cooling medium to the reflux chamber and passageway in the column. I have found it convenient to provide a pressure gauge 144 to indicate the pressure of the air in the compressed air line 120. To prevent overcooling, I have found it desirable to provide a minute, continuous vent or leak of air from bottle 52, for example, through vent line 142 communicating with line 120 and provided with an adjustable valve 143 whereby the residual compressed air remaining after each cessation of the air supply may be rapidly vented.

In actual practice, to effect smoother and more nearly continuous cooling, I provide, in the electrical connection 136, a conventional, motor-driven, circuit interrupter device, indicated generally by the numeral 146. This interrupter device serves to make and break the circuit periodically so that, when operated, valve 138 is opened and closed intermittently to permit successive small "puffs" or surges of air to flow through the valve 124 and line 120 into bottle 52, instead of a relatively large surge as would be the case if no such circuit interrupter device were provided.

If desired, additional provision may be made in connection with manometer 84 to operate emergency signals in the event of an excessive rise in pressure in the distillation column, notwithstanding reflux cooling. For this purpose, as in my prior Patent No. 1,967,258, for example, an additional contact rod (not shown), may be provided in the open leg 128 with the lower extremity thereof somewhat higher than the corresponding extremity of contact rod 132. In the event that the mercury column in the open leg 128 contacts this rod due to excessive rise in pressure, a circuit (not shown), similar to the heretofore described electrical circuits, including this rod is closed and a signal device within the circuit, which may be either an auditory signal, such as a buzzer, or a visual signal, such as a light, or both, is caused to operate to draw the attention of the operator to the emergency conditions existing in the system. Reference may be made to my prior Patent No. 1,967,258, above referred to, for a complete showing and description of the emergency signal construction and operation. If desired, the contact rod in the emergency signal circuit may be electrically connected to the heating cartridge 36 and may be operative, through a relay, to disconnect the heat input to the distilling bulb when the mercury contacts this rod. In this manner the operator will be aided by a reduction in the rate of rise of distillation pressure within the column, thus giving the operator more time to correct conditions before the mercury may be forced out of the open leg 128 of manometer 84.

In order to secure a record of the temperature at which the various fractions pass out of tube 12 in vapor form, I provide in the upper portion thereof a thermo-couple (not shown), as in my prior Patent No. 1,967,258, connected in the usual manner by connectors 148 and 149 to the terminals 148A and 149B of a recording pyrometer 150, suitably of the potentiometer type, the distillation curve recording pen thereof being indicated by the numeral 152. As such pyrometers are of a type well-known in the art, the detailed mechanism thereof is not shown. Pen 152 operates with rise in temperature upon a traveling paper sheet 154 to chart the distillation curve 156.

In the operation of such recording pyrometers, it has hitherto been customary to cause the paper sheet 154 to be moved by clock-work or other constant speed motor and thereby cause the paper sheet to travel at a constant rate of speed. The record made on this sheet indicates not only the temperature of the device under operation, but also the time at which the record is made. In accordance with the present invention, however, I provide means whereby the feed of paper sheet 154 is controlled in accordance with the quantity of vapor passing over, through the pressure rise in the fixed-volume containers, for example, receiver 92, in which the vapor fractions are received and maintained in vapor phase at a substantially constant temperature. As a result, a record made upon sheet 154, showing the temperature of vaporization of the successive vapor fractions in relation to their amount, provides at once an analytical distillation curve of the material under treatment. The mechanism suitable for this purpose is shown on the drawings in Fig. 1.

As hereinbefore set forth, manometer 104 is in direct communication with vapor line 106 leading to the 2 receiving bottles, for example, receiving bottle 92. Manometer 104 is substantially similar in form to manometer 84, a closed arm or leg 118 being in communication with receiver 92. This manometer also contains a column of mercury or other suitable conductive liquid which is connected through a suitable conductor with one pole of a suitable source of electricity.

As successive increments of vapor pass from the distillation column into the receiving bottles, for example, bottle 92, they cause corresponding increases in pressure therein. These increments of pressure are made to cause a corresponding feed of the paper sheet 154 of the pyrometer in the following manner.

The paper feed roll 151 of pyrometer 150 is mounted upon a drive shaft 158 which is driven by a gear motor 160. Shaft 158 extends through the motor and is provided at the extremity thereof with a pinion 162 which meshes with a rack 164 normally forced downward by the weight of the rack and/or a spring 166. The driving connection between the motor and the pinion 162 is effected by a manually operated clutch 168. It is, of course, apparent that clutch 168 permits the relative independent adjustment of the paper feed roll 151 and the rack 164. After the adjustment is made, clutch 168 is closed. Secured to the upper extremity of rack 164 is a cross-bracket 170 which is designed to grip and hold an elongated, metallic contact rod 172 as at 174. Contact rod 172 extends downward into leg 114 of manometer 104 through a stuffing box 176 at the top of the leg, thereby closing the leg. Contact rod 172 is initially positioned so that its lower end is, in its normal position, but a very slight distance above the mercury column, say 0.1 mm. When motor 160 is driven to operate shaft 158 and move the paper sheet 154, rack 164 is raised upwardly and contact rod 172 rises therewith.

As heretofore pointed out, the pressure in the receiving bottles, for example, receiving bottle 92, is communicated through the selective manifold to line 106 and leg 118 of manometer 104. On increase of pressure in the receiving bottle, the mercury in the manometer is caused to rise in leg 114 and contact with the rod 172, whereupon a circuit is closed through the mercury, contact rod 172, connector 178, motor 160, and the connector 180 to the opposite pole of the source of current supply. Motor 160 is thereby energized to operate shaft 158 and the feed roll 151 of the paper sheet of the recorder. In doing so, rack 164 is moved upwards, rod 172 raised out of contact with the mercury in leg 114 and the circuit through the motor is broken and the operation thereof ceases. At the same time that the movement of paper sheet 154 has been effected in this manner, pen 152 operates to indicate upon the paper sheet the temperature in the top of column 10. The paper sheet is made to bear a record showing the temperature at which various vapor fractions are permitted to pass from the top of the column and the quantity of such fractions. The resulting record is thereby made to appear directly in the form of the usual distillation curve 156. It is apparent from the foregoing and from the drawings that paper sheet 154 unrolls in an exact ratio to the rise of rack 164. In actual practice this ratio is in the order of about 2 to 1. It is also apparent that this action is intermittent since when the rising pressure in receiving bottle 92 urges the mercury into contact with rod 172, the motor 160 is energized to raise the rod 172 out of contact with the mercury and thereby break the circuit. As distillation proceeds and the pressure in receiving bottle 92 is built up, the mercury is again caused to come in contact with rod 172 to energize the motor and repeat the operation. This operation is repeated at frequent intervals until distillation of the sample is completed at which time clutch 168 is disengaged and rack 164 lowered.

The recording instrument is also provided with a pen 182 which is designed to draw a distillation rate curve 184 on the paper sheet as it unrolls. Distillation rate curve 184 is in the form of a straight line parallel to the edge of chart 154, jogged at fixed time intervals, say about one minute. The jogging of this curve may be effected as by a suitable motor (not shown) connected to the pen or by a connection from the pen to the potentiometer motor as is well understood in the art. Curve 184 provides a means for indicating and recording the distillate rate at any stage of the analysis with reference to the distillation curve 156.

Should the operator decide to stop entering the vapors into receiving bottle 92, for example, and have the vapors enter into receiving bottle 94, for example, during the course of distillation, it is necessary to first shut off connection 106 leading to leg 118 of manometer 104. This may be accomplished by a suitable manipulation of the stop-cocks in the selective manifold although it is preferred that it be accomplished by closing shut-off valve 86 as hereinafter described. Connections are then made from line 72 leading from the column to receiving bottle 94 by a suitable adjustment of stop-cock 186 in the selective manifold. The shaft of motor 160 is now disengaged by the clutch 168 and pinion 162 released from rack 164. Shut-off valve 86 may now be opened, thereby permitting the mercury in manometer 104 to come to equilibrium with the pressure in the connected receiving bottle 94. The operator then places pinion 162 on the rack 164, which in the meantime was lowered by the weight of the rack and by spring 166, engages the shaft of the motor through clutch 168 and proceeds with the distillation. The section of the distillate curve made in response to pressure increases in receiving bottle 94 is added upon the end of the preceding section of the distillation curve formed in response to the pressure increases in receiver 92.

As heretofore pointed out the rate of flow of vapor from the fractionating column 10 is controlled by two valves, in series; one the hydraulic operated distillate rate valve 80 and the other the hydraulic operated shut-off valve 86. The construction and operation of these valves will now be described.

The hydraulic operated distillation rate valve (Figs. 5, 7, 8 and 9) comprises a valve body 188 provided with a recess as at 190 into which the needle seat member 192 is inserted and secured as by, for example, a drive fit. Needle seat member 192 is provided with an internal bore 194 through which vapors from line 78 are adapted to flow. The upper end of bore 194, at 195 receives the needle valve 196, of special construction, to control the quantity of vapors flowing through the bore or valve seat 195. The diameter of the needle valve 196, except for the lower extremity thereof, corresponds with the diameter of bore 194. The lower extremity of the needle valve is tapered as at 198 to permit varying amounts of vapor to flow past the needle seat 195 depending upon the position of the needle with respect thereto. The length of the taper may vary as desired, although I prefer that it be in the order of about one inch long. The taper is preferably calculated to be such as to make the change in rate of flow through the valve exponential. With the needle in any particular position, for example, the position shown in Fig. 7, controlled amounts of vapors are permitted to flow through bore 194 to the bottom of recess 190.

Member or plug 192 is recessed or filed down at its top, as at 200, and along one side, as at 202, to provide a passageway 204 for the flow of vapors from bore 194 to a discharge tube 206 leading to the lower extremity of the shut-off valve 86. The stem 197 of needle valve 196 extends through a bore 194 in an extension 208 from valve body 196, and the upper untapered extremity of the stem of the needle valve is held in a rod 210, as by a drive fit. The rod 210, in turn, is secured, as by a drive fit, to a follower 212 which extends up into a water-tight vessel or pot 214. Within pot 214 and surrounding needle follower 212 is a bellows assembly comprising an expansible bellows (preferably metallic) 216 and an actuating member 218 secured to the bellows and having a centrally disposed depending sleeve or guide 220 into which the upper extremity of follower 212 enters and is secured. Within the bellows assembly and surrounding 220 is a coiled spring 222 which normally acts to raise the actuating member 218 of the bellows assembly towards the top of pot 214 and thereby raise needle valve 196. The pot 214 is provided with a water inlet 224 and a water outlet 226.

To prevent the vapors within the bore 194 from passing out of the system through the bore in extension 208, a tube 228 of rubber or other suitable elastic material, such as Neoprene, is provided which is secured to the upper extremity of extension 208 and the lower extremity of valve stem 210 with vapor-tight fits. The valve body 188 is secured to the under side of the pot 214 and supported by supports 230.

Mounted on the rod 210, suitably by a collar 232, is a pointer 234 which moves with the needle valve and which serves to indicate the position of the needle valve with respect to its seat. Thus, the position of the pointer along the vertical edge of chart 236 indicates the position of the needle valve with respect to its seat. For convenience of the operator, curves may be provided on chart 236 for converting the pointer position to cubic centimeters per minute of the various gases flowing past the needle under operating conditions. Extending through ears 237 on the frame supporting the chart 236 are a pair of opposed adjustable bolts 238 which limit the movement of the pointer and hence of the needle valve within its seat. These bolts are usually adjusted at the start of the operation for minimum and maximum flows of vapor through the needle valve.

After the vapors pass through the needle valve mechanism of the distillation rate valve hereinabove described, they pass through conduit 206, through a flexible conduit or tube 240, suitably formed of artificial rubber, Neoprene or the like, through line 88 and into the receiving bottles. The flexible tube 240 constitutes in effect a valve which is closed by the action of water entering inlet 242 of a water-tight pot 244 housing an expansible bellows 246. Incoming water compresses bellows 246 and urges plunger 248 and follower plate 250 downward to compress the tube between plate 250 and a lower plate 252, which is supported by bolts 254 threaded into the bottom of pot 244.

The operations of the valves 80 and 86 control the rate of distillation, as will be apparent from the following:

When the mercury in leg 128 of manometer 84 fails to make electrical contact with the lower wire 134, solenoid valve 256 (Fig. 11) is de-energized and is opened by the action of spring 258 urging valve 260 away from its seat. Water from the water supply line 262 is then caused to flow through water strainer 264, water pressure regulating valve 266, through line 267, through hand control valve 268, through line 269 and through the solenoid valve 256. From valve 256 the water is diverted into two branches, one flowing through line 270 to the inlet 242 of the shut-off valve 86 and the other through line 271, hand control valve 272, check valve 273 and line 274 to the inlet 224 of the rate valve 80. These two flows of water are so proportioned, by hand control valve 272, that almost the full stream of water passes into the shut-off valve 86, thereby quickly closing valve 240, and a reduced stream flows into rate valve 80 to close it at a relatively slow rate. It is, of course, apparent that water entering inlet 224 of rate valve 80 urges bellows 216 downwardly against the action of spring 222 and thereby urges needle valve 196 into bore 194 to close the valve.

When, due to natural functioning of the fractionating column, the pressure in the distillation column 10 builds up sufficiently to urge the mercury in leg 128 of manometer 104 into contact with rod 134, solenoid valve 256 is energized and closed and no more water flows to either the shut-off valve 86 or the distillation rate valve 80. Thereupon, the shut-off valve 86 opens at a relatively rapid rate due to the action of the elastic bellows urging the water out of pot 244, through a portion of the inlet line 270, through line 275, through adjustable valve 276 and out through the water drain line 277. Distillation of the sample now proceeds at a rate fixed by the seat of the rate valve needle 196. Check valve 273 will act to prevent back flow of water from valve 80.

If, at any time, the reflux temperature at the top of the column should rise as little as even ⅕° C. during the distillation of a particular compound, an electrical connection 278 from the potentiometer recorder 150 actuates a temperature responsive solenoid valve 280, similar to valve 124, to open it and cause the water to flow from the inlet line, through line 269, line 282, through valve 280, through line 283, through hand adjustable valve 284, through check valve 285, through line 286, through common line 274 and into inlet 224 of the rate valve 80, thereby closing the rate valve towards its minimum setting very rapidly whenever such temperature rise occurs. A drop in the temperature at the top of the column does not, however, affect the rate valve. A suitable mechanism for actuating valve 280 in response to temperature rises in the column will now be described.

It is to be understood that the mechanical and electrical mechanism employed to effect opening of valve 280, in response to temperature rise in the column, will vary, necessarily, with the particular temperature recording potentiometer used in accordance with my invention. Thus, for example, a control mechanism, as in Figs. 1, 10 and 11 of my prior Patent No. 1,967,258, may be used for this purpose if the recording potentiometer is of the type shown and described in that patent. I prefer, however, to use the mechanism shown in Fig. 15 herein. This mechanism, in the main, is of conventional design, construction and operation and is a part of the well-known recording potentiometer sold by the Brown Instrument Company of Philadelphia, Pennsylvania. In consequence, no more of the Brown potentiometer recording mechanism is shown in Fig. 15 than is sufficient to show and explain the type of control mechanism connected thereto for use in accordance with the present invention.

Referring to Fig. 15, there is shown a conventional galvanometer 325 such as is used in null-point automatic balancing potentiometer recorders. The galvanometer is suspended between an upper and lower suspension strip 326 and 327, respectively. The numerals 328 and 329 refer, respectively, to the upper and lower electrical leads to the potentiometer circuit. Galvanometer pointer 330 swings beneath the stationary upper table 331 of the conventional chopper mechanism, and between the side limiting table supports 332 and 333. In operation, pointer 330 is periodically clamped against table 331 by the rising movable stepped-table 334 of the chopper mechanism. The upper edge 335 of table 334 is in the form of a serrated curve, arranged as a staircase, with steps of varying size to fit the curve as shown. The horizontal step portions 336 of the staircase serve to clamp pointer 330 against stationary table 331 and to limit the upper travel of table 334. It will be obvious that the more pointer 330 is displaced in one direction, with reference to the zero mark 337 on table 331, the higher table 334 will rise, and, conversely the more pointer 330 is displaced in the opposite direction, with reference to zero mark 337, the lower the limit to which the table may rise before clamping pointer 330.

Table 334 is provided with rearwardly extending arms 338, having free ends which are secured to shaft 339. Shaft 339 and table 334 are oscillated by a crank 340, secured to the motor shaft of a constant speed motor 341, through the medium of a link 342 and a follower arm 343. Arm 343 is kept tightly against a pin 344, carried by link 342, as by a spring 345.

The portion of the control mechanism, hereinabove described is conventional.

In accordance with conventional practice, table 334 is made to oscillate about once every three seconds. At every maximum rise position, suitable conventional mechanism (not shown) is actuated normally to move the pen carriage 152.

In accordance with the present invention, to obtain the desired control whenever the temperature in the column, as indicated by the recorder mechanism, rises even as little as about 1/5° C., I utilize this hereinabove described conventional chopper mechanism to effect opening and closing of valve 280 as follows:

I secure to one end of shaft 339 a crank arm 346 which serves to indicate the position of movable table 334 with respect to stationary table 331. On upward movement of arm 346, the free end thereof strikes contact arm extension 347 of contact arm 348 which is fulcrumed as at 349. A stationary contact 350 leading to electrical line 278 is so positioned opposite a grounded movable contact 351 carried by contact arm 348 that electrical contact is made just as arm 346 begins to press against contact arm extension 347. The arrangement of the contacts 350 and 351 is such that electrical contact is made at a point corresponding to a pointer deflection to the left of "zero" point 337 of stationary table 331, corresponding to a temperature rise in the column of about 1/5° C., when movable table 334 clamps pointer 330 in this position. It is, of course, to be understood that contact arm 348 is insulated from its contacts. This contact arm is made of a suitable springy metal or metal alloy and the dimensions thereof are such that a further rise of movable table 334 beyond that sufficing to make electrical contact between contacts 350 and 351, as described, will merely place more pressure on the contacts without distortion of the parts or interference with the movable table action.

It will be obvious from the foregoing that whenever the temperature rises even a small fraction of a degree C., as reflected by the galvanometer pointer deflection to the left of "zero," the action of the arm 348 in closing contacts 350 and 351 will ground electrical line 278 and cause valve 280 to function as described above. However, any drop of temperature in the column will not effect valve 280 since in such cases, contacts 350 and 351 remain open, and the contact arm 348 will simply rest on a support, as at 352.

Opposing these two closing actions of the rate valve 80 hereinabove described, one due to a drop in pressure in the column and the other to a rise in the reflux temperature of the column, is a continuous leak of water from pot 214, through outlet 226, through line 288, through adjustable valve 290, preferably a needle valve, and out through the water drain 277. Thus the rate valve continuously tends to recover from its closed position at a relatively slow rate.

The distillation rate controls hereinabove described are the main controls which function automatically as already described to control the rate of distillation. In addition to these main controls, there are two auxiliary distillation rate controls which also function automatically to control the rate of distillation, but which are used separately and independently, when desired, during certain stages only of the distillation as hereinafter described.

During the course of a fractional distillation as heretofore described, when gas fractions are collected in succeeding receivers, for example, one fraction in receiver 92 and one in receiver 94, the column is first closed off from the system, and connection 106 leading to leg 118 of manometer 104 is closed by suitable manipulation of the stopcocks. These fractions are usually "cut" at various points along the conventional temperature scale (not shown) of the recording potentiometer 150, corresponding to, for example, the methane-ethane, ethane-propane, etc. "cut" points. In my preferred practice, I close-off or shut-in the column during this change over from one receiver to another by closing shut-off valve 86. This may be accomplished by means of a suitable manually operated switch 300, in electrical line 137, which may be opened to de-energize valve 256 and thereby permit water to flow into shut-off valve 86 as hereinbefore described; however, I prefer that it be accomplished automatically as follows:

Positioned above the recording potentiometer 150 and extending substantially the full length of the conventional temperature scale (not shown) of the recorder is a guide bar 301 carrying thereon a movable contact switch block 302 which can be manually positioned at any desired point along the bar. The switch is included in a circuit for actuating valve 256 through electrical line 303 and manually operated double pole double throw switch 313. Switch block 302 carries a movable insulated switch lever member 307, spring-pressed to the position shown. Lever 307, in turn, carries a pair of contacts 307—a and 307—b which cooperate with a pair of stationary contacts 309 and 310. Contact 309 is grounded. Movable contact 307—a is connected by wire 311—a to contacting blade 312—a of manually operable, double pole double throw switch 313. Movable contact 307—b is connected by wire 311—b to a stationary contact 314 in switch 313. Switch 313 has three stationary contacts, 314, 314—a and 315, respectively, between which mechanically linked movable blades 312—a and 312—b may travel as shown in the drawing. Blade 312—b is connected through line 303 to the solenoid winding of valve 256 and thence to the terminal. It is evident that when movable contact 307—b is moved from its closed position, as shown, that lines 303 will be de-energized, if not already de-energized as heretofore described.

Referring back to switch 313, contact 315 is connected by line 320 to the solenoid winding of valve 280, and thence to terminal.

In effecting closing of the shut-off valve 86 during distillation to permit the introduction of the fractionated vapors into succeeding receivers, it must be assumed that the fractional distillation is proceeding along the boiling point plateau of a particular compound and that the movable switch 302 has been positioned at the "cut" point which is intermediate between the boiling point plateau of that compound and the boiling point plateau of the next succeeding compound, and that movable blade 312—b has been "thrown" in contact with contact 314. When the rising column reflux temperature effects travel of recording pen 152 along recording sheet 154 to a position immediately below switch 302 and coinciding with indicating finger 304 thereof, as shown in the drawings, an extension 305 from the pen carriage 306 bears against movable insulated switch lever 307 and acts, as above described, to disconnect valve 256 from line 137—a, leading to ground through line 137. Valve 256 now opens and water from the supply line 262 flows into the shut-off valve 86 to close it as hereinbefore described. The operator now changes the receivers as described above and manually sets the sliding switch 302 in the position along bar 301 corresponding to the next higher "cut" point. This operation is continued until distillation of the sample is completed.

Movable switch 302 may be used also to effect a more accurate control of the rate of distillation at the "break" or transition point from one plateau to the plateau of the next higher boiling component of the sample being distilled. Such control is optional, but is desirable in connection with the separation by distillation of close-boiling compounds such as iso-butane from isobutylene and iso-butane from n-butane.

When switch 302 is used for this purpose, movable contact blade 312—a of switch 313 is "thrown" over to engage contact 315, simultaneously disengaging contact blade 312—b from contact 314 and connecting blade 312—b to stationary contact 314—a. Contact 314—a is connected to line 137 through line 137—b, thus bypassing the switch 302. Switch 302 is now positioned along bar 301 at a point corresponding approximately to a fraction of a degree, say, about 1/5° C., beyond the point on the potentiometer scale corresponding to the boiling point plateau of the compound that is being distilled at the time and for which control is desired. When a rise in the column reflux temperature has effected travel of recording pen 152 along recording sheet 154 to the set position of switch 302, extension 305 bears against movable switch lever 307 as before and the circuit, including electrical line 320, is closed to ground through contact 309. It will be noted that in the present position of switch 313, stationary contact 310 and line 311—b are electrically inactive. Valve 280 now opens and the water from the inlet line flows into inlet 224 of the rate valve 80 as described above, thereby closing the rate valve towards its minimum setting. The improved fractionation in the column, resulting from a reduction in the distillation rate as a result of closing down the rate valve, reduces the reflux temperature to the pre-set boiling point plateau of the said compound being distilled. The pen carriage 306 moves back slightly, carrying extension 305 away from movable contact 307 to break the circuit and to de-energize valve 280. Rate valve 80 now opens as hereinabove described.

In general it may be stated that the water flowing through inlet line 267 is under a pressure in the order of about 24 to 26 pounds per square inch. The hand operated water valves 268, 284, 272, 276 and 290 are suitably adjusted at the start of the distillation operation to make possible the functioning of the mechanism as hereinabove described. Care should be exercised in connection with the adjustment of valve 276 so that the pressure of the water passing therethrough does not fall below about 18 lbs. per square inch when the shut-off valve 86 is closed.

To aid in the adjustment of the hand operated valves 268, 284, 272, 276, 290 and 126, there may be provided on the stems of each of these valves a graduated valve wheel 294 (Fig. 12) which serves to indicate the exact degree of opening of the valves. Notches 295 are provided along the periphery of the valve wheel into which a spring-pressed detent 296 extends to prevent unassisted movement of the wheel and at the same time serving as a pointer to indicate the extent of opening.

The hereinabove described tapered plunger distillation rate valve mechanism may be, and preferably is, constructed of such dimensions and precision of fit that within its limits of travel it will meter from 1 to 300 cc. of gas per minute, approximately, with gas flows for specific hydrocarbons or other gases or vapors in cc.'s per minute very closely reproducible against the positions of the plunger within its seat, as expressed by the calibration chart 236 shown in Fig. 5. In order to retain this reproducibility it is desirable to maintain the pressure of receivers 92, 94, 96, 98 and 100, at below about 50% of the fractionating column pressure, or below the "critical" down-stream pressure condition, below which further change in down-stream pressure does not affect flow of vapors or gases.

In general, it is possible to substantially fix the adjustments of needle throttling valves 284, 272 and 276, from experience, to provide best general operation of the hydraulic distillate rate control mechanism. The rate leak valve 290 may then be adjusted for desired mode of control operation. For instance, if the valve 290 is opened wider, this results in a consistently quicker opening of distillate rate valve 80, and thus a quicker recovery of distillate rate after every temperature rise and after every drop of pressure in the fractionating column, which of course exerts a closing effect on rate valve 80 as already explained above. The resulting control of the course of the distillation analysis would be to shorten distillation time, with a certain sacrifice of sharpness of separation (due to reduced reflux ratios used throughout as result of greater average opening of the rate valve 80). Conversely, closing down on rate leak valve 290 would in effect increase and prolong the effect of every upward temperature fluctuation and every downward column pressure fluctuation, thus increasing reflux ratios at crucial points in the distillation with resulting improvement in separation and accuracy, with however corresponding prolongation of total distillation time.

Similar control of control characteristics may also be obtained by varying the settings of the other throttling needle valves, although in general the effect of such variations is more complicated and not as clean cut as variation of rate leak valve 290.

The functioning of this type of control is such that the distillate rate may be varied automatically over the entire range of hydrocarbons or other gases from methane to hexane, for example, with little, if any, readjustments necessary during analysis, to obtain sharpest fractionation of individual hydrocarbons during the resulting total distillation time. The mechanism will increase the distillate rate, on a "plateau" in the distillation curve, where the separation is easy, and will automatically decrease the rate, as required, on "breaks" where a low distillate rate (corresponding to high reflux ratio) is required to minimize the size of the intermediate mixed fraction between pure components.

The effectiveness of this novel type of control, depending as it does on the balancing of closing effects on the distillate rate, according to temperature rise and to pressure fall, respectively, against the constant opening effect due to constant leak of water from the distillate rate bellows is such that for most analyses it is not even necessary to fix the minimum and maximum distillate rate limits as heretofore, although this is provided for as in Fig. 5, since this is accomplished automatically by the hydraulic control for each hydrocarbon according to the pressure and temperature response and fractionating power of the particular fractionating column used. For example, should the distillate rate on a plateau become too high, through the effect of constant leak of water from the distillation rate valve bellows, as explained above, either the column pressure will begin to fall, or the overhead temperature will begin to rise, either or both of these tending to reduce the distillate rate in the manner already explained. Similarly, if the rate on a plateau is too low, it will open gradually until limited as immediately explained. On "break," where the temperature will rise despite the closing of the distillate rate valve, sufficient vapor will still pass through the valve, which will slowly oscillate between its lowest possible position and a somewhat higher position, the latter depending on adjustment of rate valve 290, to accomplish the distillation of the intermediate fraction at high reflux ratio and in reasonable time.

It should also be pointed out that the so-called "pressure response" of the column, effecting the closing of the distillate rate valve in the manner already explained, is somewhat independent of the "temperature response" of the column, which hitherto was the only control indication used in this type of apparatus. When large boiling point differences between gaseous components are involved, as between methane and ethane, the pressure response is more positive than the temperature response, and may in fact suffice for satisfactory control action by itself. However, when the difference in boiling points of the gaseous components become less, as in the case of isobutane and n-butane separation, it has been found that the pressure response alone is not sufficiently positive or sensitive and that the temperature response is essential. The temperature response indication is, however, of value throughout the entire distillation, in conjunction with the pressure response.

In the modified operation of the fractionating column shown in Fig. 13, two thermocouples are provided in the upper portion of the column, one above the other. The upper one, 423, is normally located in the tube substantially as in my prior Patent No. 1,967,258. The lower one, 424, is located in the tube at a point somewhat below thermo-couple 423, say, in the order of about one or one and one-half inches. The upper extremities of these thermo-couples are connected to the connectors 148' and 149' through a switch 425 driven slowly, say at a speed of about 2 R. P. M., by the synchronous motor 426. Switch 425 is arranged to alternately connect and disconnect the leads from the two thermo-couples.

When the distillation is progressing on a "plateau" as indicated by, for example, plateau 156' of distillation curve 156, both thermo-couples alternately actuate pen 152 to record identical temperatures. However, when the "break" point in the distillation is reached or closely approximated, or when the reflux ratio becomes too low, the lower thermo-couple 424 indicates the temperature rise slightly ahead of the upper thermo-couple, the two thermo-couples being properly positioned for this purpose. This slight advance temperature indication causes electrical connection 278 from recorder 150 to energize valve 280 and open it to admit water to rate valve 80, during the period that thermo-couple 424 is connected in by switch 425, thereby closing it towards its minimum setting as described above. This results in a more sensitive control of the distillation rate and establishes the desired distillation reflux ratio considerably ahead of the time when the top thermo-couple would normally perform the similar function. This action permits the apparatus to anticipate a temperature rise and to increase the reflux ratio far enough ahead of the actual "break" to improve the fractionation at this point.

The above will be apparent from a consideration of the partial analytical distillation curve 156A (Fig. 14) formed on the paper sheet of the recorder when utilizing the modified column of Fig. 13. When the distillation is proceeding along a "plateau," the temperature in the reflux portion of the column is substantially uniform and the thermo-couples actuate pen 152 to record the plateau line 156ᵃ of curve 146A (shown in full lines). As the "break" point in the distillation is approached, the temperature in the reflux portion of the column begins to rise and this rise is indicated initially by thermo-couple 424 which translates the temperature rise to the recorder and causes pen 152 to record this temperature on the sheet at, for example, point 427. The switch 425 then connects in the upper couple and consequently the next position along curve 146A indicates the temperature in the column about thermo-couple 423, and since this thermo-couple has not been affected, as yet, by the temperature rise, the pen is caused to move to point 428. The alternate recordings of the temperatures in the column about the thermo-couples 424 and 423, respectively, resulting from the operation of switch 425, are shown by the zig-zag line. It will be apparent from the foregoing that the temperature rises in the column, as the "break" point is approached, are indicated initially by thermo-couple 424, as indicated by the points in the distillation curve along the dotted line 429, and the alternate points along dotted line 430 indicate the temperature rises in the portion of the column about thermo-couple 423. It is thus manifest that by the aid of this novel fractionating column, valve 280 is energized to admit water to rate valve 80 in advance of the time that valve 280 would be energized if the column contained but one thermo-couple as in my prior Patent No. 1,967,258, and the sensitiveness and the accuracy of the operation are increased.

Although the present invention has been described in connection with the details of specific method and apparatus embodying the same, it is not intended that these details shall be regarded as limitations upon the scope of the invention, except in so far as included in the accompanying claims.

I claim:

1. In apparatus for precise, batch fractional distillation, a distilling column, means for heating the lower portion thereof, means for cooling the upper portion thereof, a normally open, fluid-operated valve adapted to control the rate of distillation by controlling the flow of distillate vapors from the column, and a vapor line connecting the upper portion of said column with said valve, means responsive to pressure change at the outlet of said column to control said cooling means, means responsive to pressure drop in said column to cause fluid to flow into said valve to close it and means responsive to a temperature rise at the top of the column from any previous temperature to cause fluid to flow into said valve to decrease the opening thereof and thereby impede the flow of distillate vapors from said column.

2. In apparatus for precise, batch fractional distillation, a distilling column, means for heating the lower portion thereof, means for cooling the upper portion thereof, a normally open, fluid-operated valve adapted to control the rate of distillation by controlling the flow of distillate vapors from the column, and a vapor line connecting the upper portion of said column with said valve, means responsive to pressure change at the outlet of said column to control said cooling means and a second means also responsive to pressure change at the outlet of said column, said second pressure-responsive means including a pressure-responsive device communicating with the outlet of said column, means actuated by said pressure-responsive device on decrease in pressure at the outlet of said column to cause fluid to flow into said valve to close it, means actuated by said pressure-responsive device on increase in pressure at the outlet of said column to cause fluid to flow out of said valve to open it and means responsive to a temperature rise at the top of the column from any previous temperature to cause fluid to flow into said valve to decrease the opening thereof and thereby impede the flow of distillate vapors from said column.

3. In the apparatus set forth in claim 2 wherein said second pressure-responsive means is operable independently of said first-named means responsive to pressure change.

4. In apparatus for precise, batch fractional distillation, a distilling column, means for heating the lower portion thereof, means for cooling the upper portion thereof, a normally open, fluid-operated needle valve operable to control the rate of distillation by controlling the flow of distillate vapors from the column, a vapor line connecting the upper portion of said column with said needle valve and a second normally open, fluid-operated valve in communication with said needle valve, means responsive to pressure change at the outlet of said column to control said cooling means, means responsive to pressure drop in said column to control the flow of fluid to said valves to decrease the openings thereof and means responsive to temperature rise at the top of the column from any previous temperature to control the flow of fluid to said needle valve to decrease the opening thereof and thereby decrease the flow of distillate vapors from said column.

5. In apparatus for precise, batch fractional distillation, a distilling column, means for heating the lower portion thereof, means for cooling the upper portion thereof, a normally open, fluid-operated needle valve operable to control the rate of distillation by controlling the flow of distillate vapors from the column, a vapor line connecting the upper portion of said column with said needle valve and a second normally open, fluid-operated valve in communication with said needle valve, means responsive to pressure change at the outlet of said column to control said cooling means and a second means also responsive to pressure change at the outlet of said column, said second pressure-responsive means including a pressure-responsive device communicating with the outlet of said column, means actuated by said pressure-responsive device on decrease in pressure at the outlet of said column to cause fluid to flow into said valves to close them, means actuated by said pressure-responsive device on increase in pressure at the outlet of said column to cause fluid to flow out of said valves to open them and means responsive to a temperature rise at the top of the column from any previous temperature to cause fluid to flow into said needle valve to decrease the opening thereof and thereby impede the flow of distillate vapors from said column.

6. In apparatus for precise, batch fractional distillation, a distilling column, means for heating the lower portion thereof, means for cooling the upper portion thereof, a normally open, fluid-operated needle valve operable to control the rate of distillation by controlling the flow of distillate vapors from the column, a vapor line connecting the upper portion of said column with said needle valve and a second normally open, fluid-operated valve in communication with said needle valve, means responsive to pressure change at the outlet of said column to control said cooling means, means responsive to pressure drop in said column to control the flows of fluid to said valves to decrease the opening of said second-named valve quickly and to decrease the opening of said needle valve at a relatively slower rate, and means responsive to temperature rise at the top of the column from any previous temperature to control the flow of fluid to said needle valve to decrease the opening thereof and thereby decrease the flow of distillate vapors from said column.

7. In apparatus for precise, batch fractional distillation, a distilling column, means for heating the lower portion thereof, means for cooling the upper portion thereof, a normally open, fluid-operated needle valve operable to control the rate of distillation by controlling the flow of distillate vapors from the column, a vapor line connecting the upper portion of said column with said needle valve and a second normally open, fluid-operated valve in communication with said needle valve, means responsive to pressure change at the outlet of said column to control said cooling means, a second means also responsive to pressure change at the outlet of said column, said second pressure-responsive means including a pressure-responsive device communicating with the outlet of said column, means actuated by said pressure-responsive device on decrease in pressure at the outlet of said column to cause a relatively unrestricted flow of fluid to flow into said second named valve to close it quickly and a relatively restricted flow of fluid to flow into said needle valve to cause it to close at a relatively slower rate, means actuated by said pressure-responsive device on increase in pressure at the outlet of said column to cause a relatively unrestricted flow of fluid to flow out of said second named valve to open it quickly and a relatively restricted flow of fluid to flow out of said needle valve to open it at a relatively slower rate and means responsive to a temperature rise at the top of the column from any previous temperature to cause fluid to flow into said needle valve to decrease the opening thereof and thereby impede the flow of distillate vapors from said column.

8. In apparatus for precise, batch fractional distillation, a distilling column, means for heating the lower portion thereof, means for cooling the upper portion thereof, a normally open, fluid-operated needle valve operable to control the rate of distillation by controlling the flow of distillate vapors from the column, a vapor line connecting the upper portion of said column with said needle valve and a second normally open, fluid-operated valve in communication with said needle valve, means responsive to pressure change at the outlet of said column to control said cooling means, means responsive to pressure drop in said column to control the flows of fluid to said valves to decrease the opening of said second-named valve quickly and to decrease the opening of said needle valve at a relatively slower rate, means responsive to temperature rise at the top of the column from any previous temperature to control the flow of fluid to said needle valve to decrease the opening thereof and thereby decrease the flow of distillate vapors from said column, and means for continuously bleeding fluid from said needle valve whereby said needle valve continuously tends to return to normal position.

9. In apparatus for precise, batch fractional distillation, a distilling column, means for heating the lower portion thereof, means for cooling the upper portion thereof, a normally open, fluid-operated needle valve operable to control the rate of distillation by controlling the flow of distillate vapors from the column, a vapor line connecting the upper portion of said column with said needle valve and a second normally open, fluid-operated valve in communication with said needle valve, means responsive to pressure change at the outlet of said column to control said cooling means, a second means also responsive to pressure change at the outlet of said column, said second pressure-responsive means including a pressure-responsive device communicating with the outlet of said column, means actuated by said pressure-responsive device on decrease in pressure at the outlet of said column to cause a relatively unrestricted flow of fluid to flow into said second-named valve to close it quickly and a relatively restricted flow of fluid to flow into said needle valve to cause it to close at a relatively slower rate, means actuated by said pressure-responsive device on increase in pressure at the outlet of said column to cause a relatively unrestricted flow of fluid to flow out of said second-named valve to open it quickly and a relatively restricted flow of fluid to flow out of said needle valve to open it at a relatively slower rate, means responsive to a temperature rise at the top of the column from any previous temperature to force fluid to flow into said needle valve to decrease the opening thereof and thereby impede the flow of distillate vapors from said column and means for continuously bleeding fluid from said needle valve whereby said needle valve continuously tends to return to normal position.

10. In apparatus for precise, batch fractional distillation, a distilling column, means for heating the lower portion thereof, means for cooling the upper portion thereof, a normally open, fluid-operated throttling valve adapted to control the rate of distillation by controlling the flow of distillate vapors from the column, and a vapor line connecting the upper portion of said column with said valve, means responsive to pressure change at the outlet of said column to control said cooling means and means responsive to temperature rise at the top of the column from any previous temperature to control the flow of fluid to said valve to decrease the opening thereof and thereby decrease the flow of distillate vapors from said column.

11. In apparatus for precise, batch fractional distillation, a distilling column, means for heating the lower portion thereof, means for intermittently cooling the upper portion thereof, a normally open, fluid-operated valve adapted to control the rate of distillation by controlling the flow of distillate vapors from the column, and a vapor line connecting the upper portion of said column with said valve, means responsive to pressure change at the outlet of said column to control said cooling means, means responsive to pressure drop in said column to cause fluid to flow into said valve to close it and means responsive to a temperature rise at the top of the column from any previous temperature to cause fluid to flow into said valve to decrease the opening thereof and thereby impede the flow of distillate vapors from said column.

12. In apparatus for precise, batch fractional distillation, a distilling column, means for heating the lower portion thereof, means for intermittently cooling the upper portion thereof, a normally open, fluid-operated valve adapted to control the rate of distillation by controlling the flow of distillate vapors from the column, and a vapor line connecting the upper portion of said column with said valve, means responsive to pressure change at the outlet of said column to control said cooling means and means responsive to temperature increase at the top of the column from any previous temperature to cause fluid to flow into said valve to decrease the opening thereof and thereby impede the flow of distillate vapors from said column.

13. In apparatus for precise, batch fractional distillation, a distilling column, means for heating the lower portion thereof, means for cooling the upper portion thereof, a normally open, fluid-operated needle valve operable to control the rate of distillation by controlling the flow of distillate vapors from the column, a vapor line connecting the upper portion of said column with said needle valve and a second normally open, fluid-operated valve in communication with said needle valve, means responsive to pressure change at the outlet of said column to control said cooling means and means responsive to temperature rise at the top of the column from any previous temperature to control the flow of fluid to said needle valve to decrease the opening thereof and thereby decrease the flow of distillate vapors from said column.

14. In apparatus for precise, batch fractional distillation, a distilling column, means for heating the lower portion thereof, means for cooling the upper portion thereof, a normally open, fluid-operated needle valve operable to control the rate of distillation by controlling the flow of distillate vapors from the column, a vapor line connecting the upper portion of said column with said needle valve and a second normally open, fluid-operated valve in communication with said needle valve, means responsive to pressure change at the outlet of said column to control said cooling means, means responsive to temperature increase at the outlet of said column from any previous temperature to cause fluid to flow into said needle valve to close it and thereby impede the flow of distillate vapors from said column and means operable on decrease in temperature at the outlet of the column to cause fluid to flow from said needle valve to open it.

15. In apparatus for precise, batch fractional distillation, a distilling column, means for heating the lower portion thereof, means for cooling the upper portion thereof, a normally open, fluid-operated needle valve operable to control the rate of distillation by controlling the flow of distillate vapors from the column, a vapor line connecting the upper portion of said column with said needle valve and a second normally open, fluid-operated valve in communication with said needle valve, means responsive to pressure change at the outlet of said column to control said cooling means, a second means also responsive to pressure change at the outlet of said column, said second pressure-responsive means including a pressure-responsive device communicating with the outlet of said column, means actuated by said pressure-responsive device on decrease in pressure at the outlet of said column to cause a relatively unrestricted flow of fluid to flow into said second-named valve to close it quickly and a relatively restricted flow of fluid to flow into said needle valve to cause it to close at a relatively slower rate, means actuated by said pressure-responsive device on increase in pressure at the outlet of said column to cause a relatively unrestricted flow of fluid to flow out of said second-named valve to open it quickly and a relatively restricted flow of fluid to flow out of said needle valve to open it at a relatively slower rate, means responsive to an increase in temperature at the outlet of said column to cause fluid to flow into said needle valve to close it and means continuously operable to cause fluid to flow out of said needle valve to open it, the flow of fluid into and out of said needle valve being restricted.

16. In apparatus for precise, batch fractional distillation, a distilling column, means for heating the lower portion thereof, means for intermittently cooling the upper portion thereof, a normally open, fluid-operated needle valve operable to control the rate of distillation by controlling the flow of distillate vapors from the column, a vapor line connecting the upper portion of said column with said needle valve and a second normally open, fluid-operated valve in communication with said needle valve, means responsive to pressure change at the outlet of said column to control said cooling means, a second means also responsive to pressure change at the outlet of said column, said second pressure-responsive means including a pressure-responsive device communicating with the outlet of said column, means actuated by said pressure-responsive device on decrease in pressure at the outlet of said column to cause a relatively unrestricted flow of fluid to flow into said second-named valve to close it quickly and a relatively restricted flow of fluid to flow into said needle valve to cause it to close at a relatively slower rate, means actuated by said pressure-responsive device on increase in pressure at the outlet of said column to cause a relatively unrestricted flow of fluid to flow out of said second-named valve to open it quickly and a relatively restricted flow of fluid to flow out of said needle valve to open it at a relatively slower rate, means responsive to an increase in temperature at the outlet of said column to cause fluid to flow into said needle valve to close it and means continuously operable to cause fluid to flow out of said needle valve to open it, the flow of fluid into and out of said needle valve being restricted.

17. In apparatus for precise fractional distillation, a fractional distillation column, means for applying heat to the lower portion of the column, means for providing a cooling medium in cooling relationship to the upper portion of the column, and means for controlling the supply of cooling medium thereto, said controlling means including a manometer communicating with the outlet of said column, said manometer containing an electrically conductive liquid, a contact member in said manometer adapted to be contacted by the liquid therein on increase of pressure in the distillation column, and an electrical circuit adapted to be closed on said contact to operate said means for controlling the supply of cooling fluid to the column, said electrical circuit including a periodic circuit interrupter adapted to open and close said circuit while said liquid is in contact with said contact member whereby the supply of cooling fluid to the column is intermittent.

18. In apparatus for precise fractional distillation, a fractional distillation column, means for applying heat to the lower portion of the column, means for providing a cooling medium in cooling relationship to the upper portion of the column, and means for controlling the supply of cooling medium thereto, said controlling means including a valve for controlling the supply of cooling fluid to the distillation column, a normally open electrical circuit for controlling the operation of said valve, said circuit including a periodic circuit interrupter which is adapted to open the circuit intermittently when closed and thereby intermittently open said valve, a manometer communicating with the outlet of said column, said manometer containing an electrical conductive liquid, and a contact member adapted to be engaged by said liquid on change in pressure in the column to close said valve controlling circuit.

19. In distillation apparatus, a distillation column having means for supply heat at its lower end, means for cooling the column at its upper end, said means comprising a vessel for cooling fluid in heat-conductive relationship to the upper portion of the column, a supply container for the cooling fluid, means for conducting the cooling fluid from said container to the cooling vessel, means for intermittently supplying a pressure fluid to the supply container to intermittently force the cooling medium into said vessel, said means comprising a valve for controlling the supply of pressure fluid, a normally open electrical circuit including a periodic circuit interrupter for intermittently operating said valve when the electrical circuit is closed, a manometer communicating with the outlet and the column, said manometer containing an electrically conductive liquid, and an electrical contact within the manometer adapted to be engaged by the conductive liquid on rise of pressure at the outlet of the column to close said electrical circuit and thereby intermittently operate said valve to intermittently supply fluid under pressure to the supply container of the cooling medium.

20. In distillation apparatus, a batch distillation column having means for supplying heat at its lower end, means for cooling the column at its upper end, said means comprising a vessel for cooling fluid in heat-conductive relationship with the upper portion of the column, a supply container for the cooling fluid, means for conducting the cooling fluid from said container to the cooling vessel, and means for supplying a pressure fluid intermittently to the supply container to force the cooling medium intermittently into said vessel, said means comprising an intermittently operated valve for controlling the supply of pressure fluid, pressure-responsive means connected with the outlet of the column, and means operable thereby on rise of pressure within the column to intermittently operate said valve and thereby intermittently supply the pressure fluid to said container for the cooling medium, and means for venting excess of pressure fluid from said supply container.

21. In combination with a batch distilling column, means for receiving vapors delivered therefrom and for retaining said vapors in vapor form whereby the amount of said vapors received is indicated by changes of pressure therein, and recording means comprising a temperature-responsive member, a thermo-couple connection from said column to said temperature-responsive member, a pressure-responsive member, means inter-connecting said pressure-responsive member with said receiver, a normally open, fluid-operated throttling valve operable to control the rate of distillation by controlling the flow of distillate vapors from the column and means actuated by said temperature-responsive member on rise of temperature at the top of said column from any previous temperature to control the flow of fluid to said valve to decrease the opening thereof.

22. In combination with a batch distilling column, recording means comprising a temperature-responsive member, a thermo-couple connection from said column to said temperature-responsive member, a normally open, fluid-operated throttling valve operable to control the rate of distillation by controlling the flow of distillate vapors from the column and means actuated by said temperature-responsive member on rise of temperature at the top of said column from any previous temperature to control the flow of fluid to said valve to decrease the opening thereof.

23. In combination with a batch distilling column, distillation recording means comprising a temperature-responsive member, said temperature-responsive member having a recording arm mechanism adapted to move on actuation of said temperature-responsive member, a thermo-couple connected from said column to said temperature-responsive member, movable means mounted above said temperature-responsive member in advance of said recording arm mechanism, a normally open, fluid-operated needle valve operable to control the rate of distillation by controlling the flow of distillate vapors from the column and means actuated on contact of said movable means by said recording arm mechanism on rise of temperature in said column to control the flow of fluid to said valve to decrease the opening thereof.

24. In combination with a batch distilling column, distillation recording means comprising a temperature-responsive member, said temperature-responsive member having a recording arm mechanism adapted to move on actuation of said temperature-responsive member, a thermo-couple connection from said column to said temperature-responsive member, movable means mounted above said temperature-responsive member in advance of said recording arm mechanism, a normally open, fluid-operated needle valve operable to control the rate of distillation by controlling the flow of distillate vapors from the column, a vapor line connecting the upper portion of said column with said needle valve, and a second normally open, fluid-operated valve in communication with said needle valve through which the vapors from said column are adapted to flow, said second-named valve being operable to stop distillation in the column on closing thereof and means actuated on contact of said movable means by said recording arm mechanism on rise of temperature in said column to cause fluid to flow into said second-named valve to close it.

25. In combination with a batch distilling column having a pair of thermo-couples positioned in the upper portion thereof, one above the other, distillation recording means comprising a temperature-responsive member, electrical connections from said thermo-couples to said temperature-responsive member and means intermediate said electrical connections and thermo-couples adapted to alternately connect each thermo-couple with said electrical connections, a normally open, fluid-operated valve adapted to control the rate of distillation by controlling the flow of distillate vapors from the column and means actuated by said temperature-responsive member on rise of temperature at the top of said column from any previous temperature to cause fluid to flow into said valve to decrease the opening thereof.

26. In combination with a batch distilling having a pair of thermo-couples positioned in the upper portion thereof, one above the other, distillation recording means comprising a temperature-responsive member, said temperature-responsive member having a recording arm mechanism adapted to move on actuation of said temperature-responsive member, electrical connections from said thermo-couples to said temperature-responsive member and means intermediate said electrical connections and said thermo-couples adapted to alternately connect each thermo-couple with said electrical connections, movable means mounted above said temperature-responsive member in advance of said recording arm mechanism, a normally open, fluid-operated valve adapted to control the rate of distillation by controlling the flow of distillate vapors from the column and means actuated on contact of said movable means by said recording arm mechanism on rise of temperature at the top of said column from any previous temperature to cause fluid to flow into said valve to decrease the opening thereof.

27. In apparatus for precise, batch fractional distillation, a distillation column, means for heating the lower portion thereof, means for providing a cooling medium in cooling relationship to the upper portion of the column, means for controlling the supply of cooling medium thereto, said controlling means including a manometer communicating with the vapor outlet of said column, said manometer containing an electrically conductive liquid, a contact member in said manometer adapted to be contacted by the liquid therein on increase of pressure in the distillation column and an electrical circuit adapted to be closed on said contact to operate said means for controlling the supply of cooling fluid to the column, a normally open, fluid operated valve in communication with the outlet of said column and through which distillate vapors from said column are normally adapted to flow, a valve control means for controlling the flow of fluid to said valve and thereby control the operation of said valve, a second contact member in said manometer in contact with said fluid and an electrical circuit from said second contact member to said valve controlled means, said valve controlled means being normally actuated through said liquid, said second-named contact member, and said second-named electrical circuit to prevent the flow of fluid to said valve and being operable on decrease in pressure in the distillation column to cause fluid to flow to said valve to close it and thereby restrict the flow of distillate vapors therethrough.

28. In apparatus for precise, batch fractional distillation, a distillation column, means for heating the lower portion thereof, means for providing a cooling medium in cooling relationship to the upper portion of the column, means for controlling the supply of cooling medium thereto, said controlling means including a manometer communicating with the vapor outlet of said column, said manometer containing an electrically conductive liquid, a contact member in said manometer adapted to be contacted by the liquid therein on increase in pressure in the distillation column and an electrical circuit adapted to be closed on said contact to operate said means for controlling the supply of cooling fluid to the column, a normally open, fluid-operated valve in communication with the outlet of said column and through which distillate vapors from said column are normally adapted to flow, a valve control means for controlling the flow of fluid to said valve and thereby control the operation of said valve, a second contact member in said manometer in contact winth said fluid and an electrical circuit from said second contact member to said valve control means, said valve control means being normally actuated through said liquid, said second-named contact member, and said second-named electrical circuit to prevent the flow of fluid through said valve and being adapted to operate to cause fluid to flow to said valve to close it on decrease in pressure in the distillation column and thereby restrict the flow of distillate vapors therethrough, distillation recording means including a temperature-responsive member, a thermo-coupled connection from said column to said temperature-responsive member, a second valve control means for controlling the supply of fluid to said valve and thereby control the operation of said valve, and means actuated by said temperature-responsive member on rise of temperature in the column from any previous temperature to actuate said second valve control means and thereby permit fluid to flow to said valve to close it and thus impeded the flow of distillate vapors therethrough.

29. In apparatus for precise, batch fractional distillation, a distillation column, means for heating the lower portion thereof, means for providing a cooling medium in cooling relationship to the upper portion of the column and means for controlling the supply of cooling medium thereto, said controlling means including an electrical circuit operable in response to an increase of pressure in the column to increase the supply of said cooling medium to said column, a normally open, fluid-operated valve in communication with the outlet of said column and through which distillate vapors from said column are normally adapted to flow, and control means for controlling the flow of fluid to said valve and thereby control the operation of said valve and, in turn, the flow of vapors therethrough, said control means including an electrical circuit operable in response to a decrease of pressure in the column to cause fluid to flow to said valve to close it and thereby impede the flow of vapors therethrough.

30. In apparatus for precise, batch fractional distillation, a distillation column, means for heating the lower portion thereof, means for providing a cooling medium in cooling relationship to the upper portion of the column and means for controlling the supply of cooling medium thereto, said controlling means including an electrical circuit operable in response to an increase of pressure in the column to increase the supply of said cooling medium to said column, a normally open, fluid-operated valve in communication with the outlet of said column and through which distillate vapors from said column are normally adapted to flow, and control means for controlling the flow of fluid to said valve and thereby control the operation of said valve and, in turn, the flow of vapors therethrough, said control means including an electrical circuit operable in response to a decrease of pressure in the column to cause fluid to flow to said valve to close it and thereby impede the flow of vapors therethrough, a distillation recording means including a temperature-responsive member, a thermo-couple connection from said column to said temperature-responsive member, a second valve control means for controlling the supply of fluid to said valve and thereby control the operation of said valve, and means actuated by said temperature-responsive member on rise of temperature in the column from any previous temperature to actuate said second valve control means and thereby permit fluid to flow to said valve to close it and thus impede the flow of distillate vapors therethrough.

31. In apparatus for precise, batch fractional distillation, a distillation column, means for heating the lower portion thereof, means for providing a cooling medium in cooling relationship to the upper portion of the column and means for controlling the supply of cooling medium thereto, said controlling means including an electrical circuit operable in response to an increase cf pressure in the column to increase the supply of said cooling medium to said column, a normally open, fluid-operated valve in communication with the outlet of said column and through which distillate vapors from said column are normally adapted to flow, and control means for controlling the flow of fluid to said valve and thereby control the operation of said valve and, in turn, the flow of vapors therethrough, said control means including an electrical circuit operable in response to a decrease of pressure in the column to cause fluid to flow to said valve to close it and thereby impede the flow of vapors therethrough, a distillation recording means including a temperature-responsive member, a thermo-couple connection from said column to said temperature-responsive member, a second valve control means for controlling the supply of fluid to said valve and thereby control the operation of said valve, and means actuated by said temperature-responsive member on rise of temperature in the column of as little as one-fifth degree C. from any previous temperature at the top of the column to actuate said second valve control means and thereby permit fluid to flow to said valve to close it and thus impede the flow of distillate vapors therethrough.

32. In apparatus for precise, batch fractional distillation, a distilling column, means for heating the lower portion thereof, means for cooling the upper portion thereof, a normally open, fluid-operated needle valve adapted to control the rate of distillation by controlling the flow of distillate vapors from the column, and a vapor line connecting the upper portion of said column with said valve, means responsive to pressure change at the outlet of said column to control said cooling means, means responsive to pressure drop in said column to control the flow of fluid to said valve to decrease the opening thereof and thereby restrict the flow of distillate vapors therethrough, and means responsive to temperature rise at the top of the column from any previous temperature to control the flow of fluid to said valve to decrease the opening thereof and thereby restrict the flow of distillate vapors therethrough and consequently decrease the flow of distillate vapors from said column.

33. In apparatus for precise, batch fractional distillation, a distillation column, means for heating the lower portion thereof, means for providing a cooling medium in cooling relationship to the upper portion of the column, means for controlling the supply of cooling medium thereto, said controlling means including a manometer communicating with the vapor outlet of said column, said manometer containing an electrically conductive liquid, a contact member in said manometer adapted to be contacted by the liquid therein on increase of pressure in the distillation column and an electrical circuit adapted to be closed on said contact to operate said means for controlling the supply of cooling fluid to the column, a normally open, fluid-operated needle valve in communication with the outlet of said column and through which distillate vapors from said column are normally adapted to flow, a valve control means for controlling the flow of fluid to said valve and thereby control the operation of said valve, a second contact member in said manometer in contact with said fluid and an electrical circuit from said second contact member to said valve controlled means, said valve controlled means being normally actuated through said liquid, said second-named contact member, and said second-named electrical circuit to prevent the flow of fluid to said valve and being operable on decrease in pressure in the distillation column to control the flow of fluid to said valve to decrease the opening thereof and thereby decrease the flow of distillate vapors from said column.

WALTER J. PODBIELNIAK.